United States Patent
Wang et al.

(10) Patent No.: US 12,487,671 B2
(45) Date of Patent: Dec. 2, 2025

(54) HEAD-MOUNTED DISPLAY AND PROJECTING METHOD

(71) Applicant: HTC Corporation, Taoyuan (TW)

(72) Inventors: Chun-Li Wang, Taoyuan (TW); Chien-Liang Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/663,010

(22) Filed: May 13, 2024

(65) Prior Publication Data

US 2025/0348136 A1     Nov. 13, 2025

(51) Int. Cl.
| | | |
|---|---|---|
| G06F 3/01 | (2006.01) | |
| G02B 27/00 | (2006.01) | |
| G02B 27/01 | (2006.01) | |
| G06V 40/10 | (2022.01) | |
| G06V 40/20 | (2022.01) | |

(52) U.S. Cl.
CPC ......... *G06F 3/013* (2013.01); *G02B 27/0093* (2013.01); *G02B 27/0101* (2013.01); *G02B 27/017* (2013.01); *G06F 3/017* (2013.01); *G06V 40/10* (2022.01); *G06V 40/28* (2022.01); *G02B 2027/0138* (2013.01)

(58) Field of Classification Search
CPC ........ G06V 40/28; G06V 40/10; G06F 3/017; G06F 3/013; G02B 2027/0138; G02B 27/017; G02B 27/0101; G02B 27/0093
See application file for complete search history.

(56) References Cited

U.S. PATENT DOCUMENTS

| | | | | |
|---|---|---|---|---|
| 6,323,884 | B1 * | 11/2001 | Bird | G06F 3/04812 715/810 |
| 6,637,883 | B1 * | 10/2003 | Tengshe | G06V 40/19 351/210 |
| 9,367,960 | B2 * | 6/2016 | Poulos | G06T 19/006 |
| 9,459,694 | B2 * | 10/2016 | Haddon | G06F 3/03543 |
| 10,871,874 | B2 * | 12/2020 | Sullivan | G06F 3/0487 |

(Continued)

FOREIGN PATENT DOCUMENTS

| | | |
|---|---|---|
| CN | 104641316 A | 5/2015 |
| CN | 112400150 A | 2/2021 |
| JP | 7249975 B2 | 3/2023 |

OTHER PUBLICATIONS

The search report of the corresponding European application No. EP 24182562.9 issued on Dec. 10, 2024.

(Continued)

*Primary Examiner* — Mihir K Rayan
(74) *Attorney, Agent, or Firm* — CKC & Partners Co., LLC

(57) ABSTRACT

A head-mounted display and projecting method are provided. The display determines an eye gaze position of a user on a display screen at each of a plurality of time points based on an eyeball trajectory. The display determines whether the eye gaze position of the user on the display screen moves from a first horizontal display area to a second horizontal display area among a plurality of horizontal display areas, and the display screen includes a target projection object in the first horizontal display area. In response to the eye gaze position of the user on the display screen moving from the first horizontal display area to the second horizontal display area, the display tilts the target projection object of the display screen toward the second horizontal display area.

18 Claims, 6 Drawing Sheets

(56) References Cited

U.S. PATENT DOCUMENTS

| | | |
|---|---|---|
| 11,644,678 B1 | 5/2023 | Castleman et al. |
| 2012/0272179 A1* | 10/2012 | Stafford ................ G06F 3/0482 |
| | | 345/157 |
| 2015/0199005 A1 | 7/2015 | Haddon |
| 2019/0018479 A1 | 1/2019 | Minami |
| 2020/0012341 A1* | 1/2020 | Stellmach ............... G06F 3/017 |

OTHER PUBLICATIONS

The office action of the corresponding Taiwanese application No. TW113143887 issued on Sep. 22, 2025.

* cited by examiner

HEAD-MOUNTED DISPLAY AND PROJECTING METHOD

BACKGROUND

Field of Invention

The present invention relates to a head-mounted display and projecting method. More particularly, the present invention relates to a head-mounted display and projecting method that can dynamically adjust the projection mechanism based on eye-tracking information.

Description of Related Art

In recent years, various technologies related to virtual reality have developed rapidly, and various technologies and applications have been proposed one after another.

In the prior art, when performing an interactive operation, the user can operate the projection object on the display screen with his or her hand (e.g., the head-mounted display performs hand tracking operation) or a handheld controller (e.g., infrared ray emitted by the controller).

However, when the user wants to interact with a lower or higher object on the display screen, the user may not be able to move his hand correctly to the operating position due to obstacles in the surrounding environment (e.g., the table in front of the user), resulting in poor user experience.

Accordingly, there is an urgent need for a projection technology that can help users improve their operating experience.

SUMMARY

An objective of the present disclosure is to provide a head-mounted display. The head-mounted display comprises a display screen and a processor, and the processor is electrically connected to the display screen. The display screen is configured to display a content to a user. The processor determines an eye gaze position of the user on the display screen at each of a plurality of time points based on an eyeball trajectory. The processor determines whether the eye gaze position of the user on the display screen moves from a first horizontal display area to a second horizontal display area among a plurality of horizontal display areas, wherein the display screen comprises a target projection object in the first horizontal display area. In response to the eye gaze position of the user on the display screen moving from the first horizontal display area to the second horizontal display area, the processor tilts the target projection object of the display screen toward the second horizontal display area.

Another objective of the present disclosure is to provide a projecting method, which is adapted for use in an electronic apparatus. The electronic apparatus comprises a display screen and a processor, the display screen is configured to display a content to a user. The projecting method comprises the following steps: determining an eye gaze position of the user on the display screen at each of a plurality of time points based on an eyeball trajectory; determining whether the eye gaze position of the user on the display screen moves from a first horizontal display area to a second horizontal display area among a plurality of horizontal display areas, wherein the display screen comprises a target projection object in the first horizontal display area; and in response to the eye gaze position of the user on the display screen moving from the first horizontal display area to the second horizontal display area, tilting the target projection object of the display screen toward the second horizontal display area.

According to the above descriptions, the projecting technology (at least including the head-mounted display and the projecting method) provided by the present disclosure assists the head-mounted display in actively adjusting the position of the target projection object by analyzing the user's eye gaze position on the display screen at multiple time points. In addition, the projecting technology provided by the present disclosure can provide different angle adjustment mechanisms to perform gradually tilting operations or direct jumping operations accordingly. Furthermore, the projecting technology provided by the present disclosure provides the function of actively adjusting the position of the projection object, thereby improving the accuracy and efficiency of user interaction operations. Since the projecting technology provided by the present disclosure solves the problem of being blocked by obstacles in the existing technology, it improves the user's service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display and projecting method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
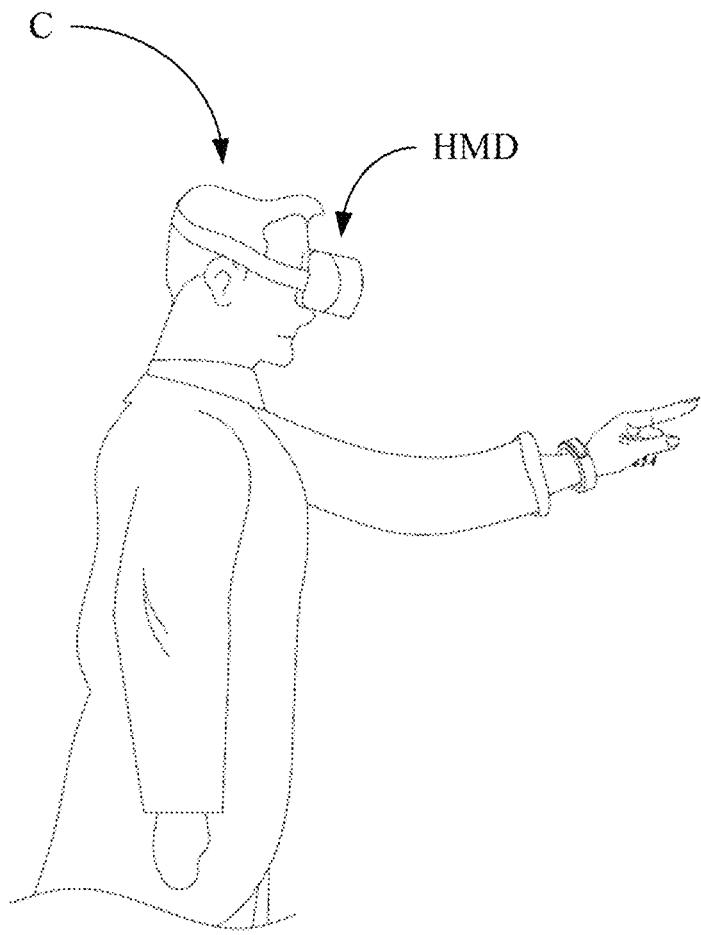
FIG. 1 is a schematic view depicting the application environment of the present disclosure.

First, the applicable scenario of the present embodiment will be described, and its schematic diagram is depicted in FIG. 1. As shown in FIG. 1, in the application environment of the present disclosure, a user C can use the head-mounted display HMD to perform input operations corresponding to the display screen in the head-mounted display HMD (e.g., a gesture input/select operation). In some embodiments, the input operation corresponding to the display screen in the head-mounted display HMD is performed by a controller held by the user C.

For example, the user C can use his fingers to operate a target projection object (e.g., a cursor) on the display screen of the head-mounted display HMD to perform input operations on the virtual keyboard on the display screen.

Figure 2A:
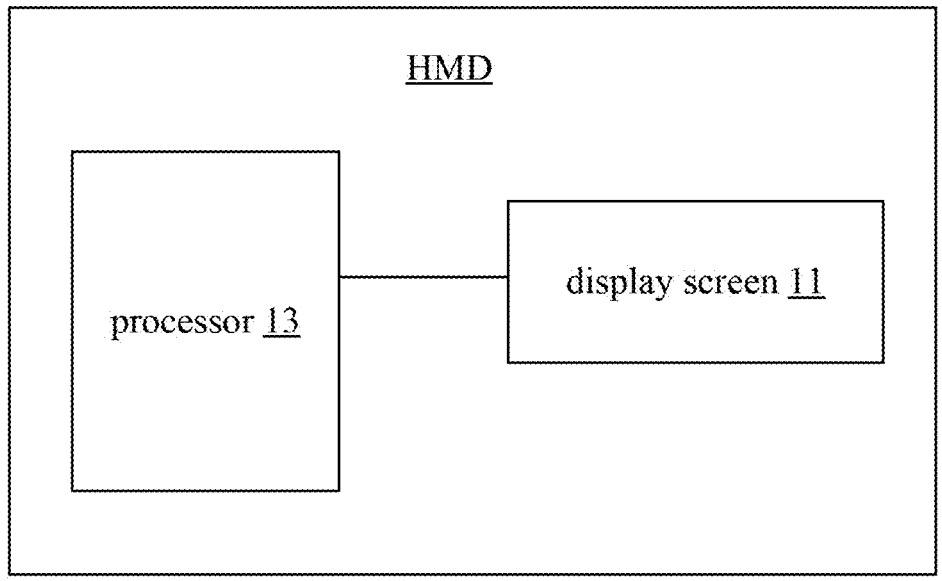
FIG. 2A is a schematic view depicting a head-mounted display of the first embodiment.

A first embodiment of the present disclosure is a head-mounted display HMD and a schematic view of which is depicted in FIG. 2A. In the present embodiment, the head-mounted display HMD comprises a display screen 11 and a processor 13, and the processor 13 is electrically connected to the display screen 11.

In the present embodiment, the display screen 11 is configured to display a content (e.g., a menu, a virtual keyboard, an application) for the user C to interact with.

It shall be appreciated that the processor 13 may be any of various processors, Central Processing Units (CPUs), microprocessors, digital signal processors or other coordinate system offset calculating apparatuses known to those of ordinary skill in the art.

First, in the present embodiment, the head-mounted display HMD determines the eye gaze position corresponding to the user C. Specifically, the processor 13 in the head-mounted display HMD determines an eye gaze position of the user C on the display screen 11 at each of a plurality of time points based on an eyeball trajectory of the user C.

In some embodiments, the eyeball trajectory of the user C can be generated by analyzing images of the positions of the user C's eyes (e.g., eye tracking technology). In some embodiments, the head-mounted display HMD is provided with an image capturing device that captures the position of both eyes of the user C.

In some embodiments, the eyeball trajectory of the user C can be generated by an eye tracker.

Next, in the present embodiment, the processor 13 determines whether the eye gaze position of the user C has moved. Specifically, the processor 13 determines whether the eye gaze position of the user C on the display screen 11 moves from a first horizontal display area to a second horizontal display area among a plurality of horizontal display areas, wherein the display screen 11 comprises a target projection object in the first horizontal display area.

It shall be appreciated that the user C can perform related interaction/selection operations based on the target projection object on the display screen 11. For example, the target projection object may be an image of a bullseye, a cursor, etc. displayed on the display screen 11.

In some embodiments, the target projection object can be generated at a corresponding position on the display screen 11 after the processor 13 analyzes the gesture of the user C.

Figure 2B:
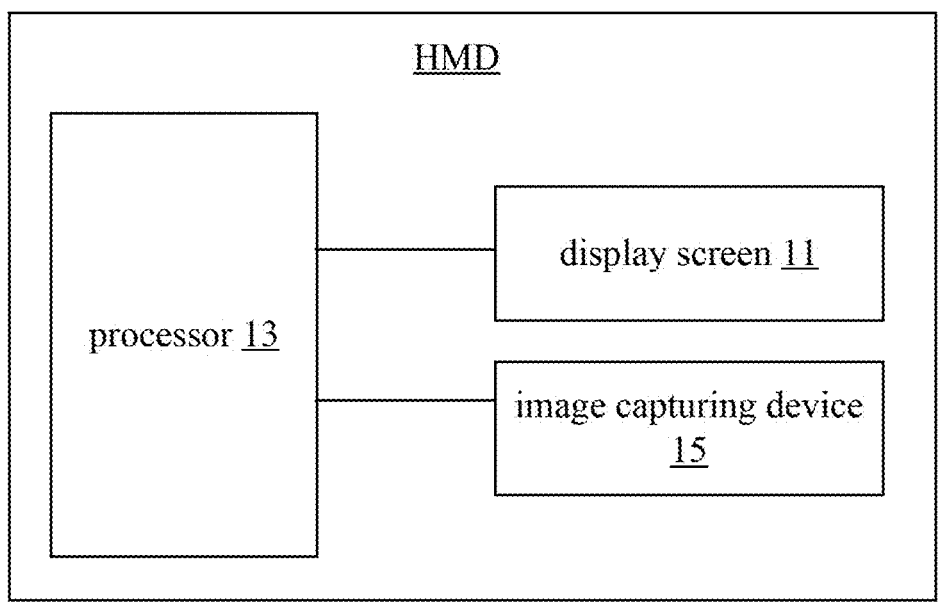
FIG. 2B is a schematic view depicting a head-mounted display of some embodiment.

Specifically, as shown in FIG. 2B, the head-mounted display HMD further comprises an image capturing device 15. The image capturing device 15 is electrically connected to the processor 13, and the image capturing device 15 is configured to generate a plurality of real-time images including a hand area corresponding to the user C. First, the processor 13 performs a gesture tracking corresponding to the user C based on the real-time images. Then, the processor 13 generates the target projection object on the display screen 11 based on the gesture tracking.

In some embodiments, the target projection object on the display screen 11 is generated by a controller held by the user C (e.g., the head-mounted display HMD analyzes the position corresponding to the infrared rays generated by the controller).

In some embodiments, the horizontal display areas are generated by the processor 13 slicing the display screen 11 into a plurality of horizontal segments.

Next, in the present embodiment, when the processor 13 determines that the eye gaze position of the user C has moved, the processor 13 actively adjusts the position of the target projection object on the display screen 11. Specifically, in response to the eye gaze position of the user C on the display screen 11 moving from the first horizontal display area to the second horizontal display area, the processor 13 tilts the target projection object of the display screen 11 toward the second horizontal display area.

In some embodiments, the processor 13 adjusts the degree of tilt by determining the degree of displacement of the eye gaze position of the user C. Specifically, the eye gaze position of the user C moves from the first horizontal display area to the second horizontal display area in a time interval, and the time interval is composed of a first time point and a second time point among the time points. First, the processor 13 calculates a displacement angle value of the eye gaze position at the first time point and the eye gaze position at the second time point. Then, the processor 13 tilts the target projection object of the display screen 11 toward the second horizontal display area based on the displacement angle value.

In some embodiments, the first time point and the second time point are a continuous time point.

It shall be appreciated that the displacement angle value of the processor 13 when tilting the target projection object should be lower than the displacement angle value of the eye gaze position. In addition, the processor 13 may perform a gradually tilting operation until it is close to the displacement angle value of the movement of the eye gaze position. In some embodiments, the processor 13 can directly jump the target projection object to a position corresponding to the displacement angle value of the movement of the eye gaze position (i.e., move directly to the target position corresponding to the second horizontal display area).

Figure 3:
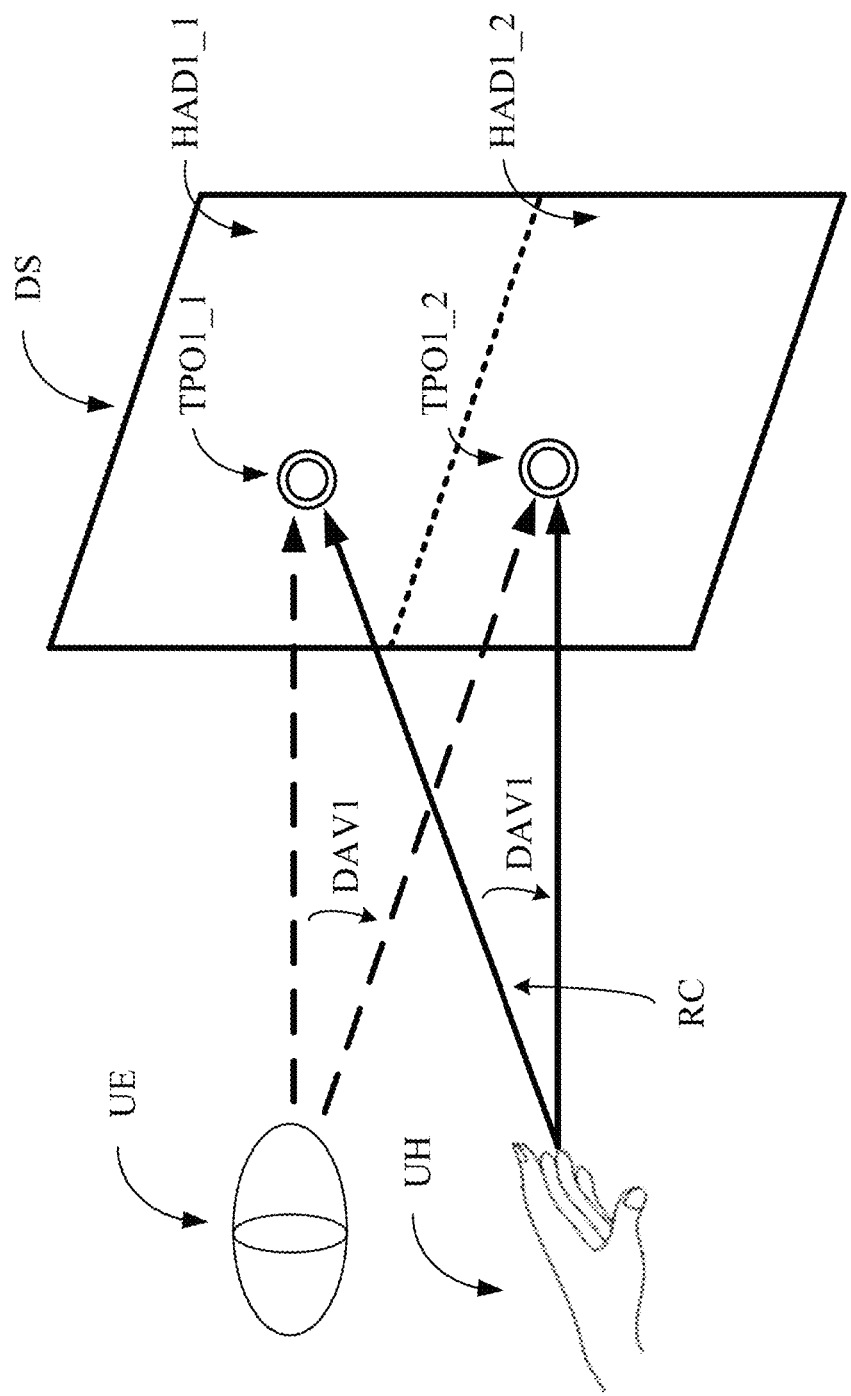
FIG. 3 is a schematic view depicting operations of some embodiments.

For ease of understanding, please refer to the operation diagram in FIG. 3. As shown in FIG. 3, the display screen DS has a first horizontal display area HAD1_1 and a second horizontal display area HAD1_2, and after the processor 13 determines the position pointed by the user's hand UH of the user C (e.g., the ray casting RC), it generates a corresponding target projection object TPO1_1. In the present example, the target projection object TPO1_1 is located in the first horizontal display area HAD1_1.

Next, the processor 13 determines that the eye gaze position of the user's eye UE has moved from the first horizontal display area HAD1_1 to the second horizontal display area HAD1_2 and has been displaced by the angle value DAV1. In the present example, in response to the movement of the eye gaze position, the processor 13 tilts the target projection object TPO1_1 of the display screen 11 toward the second horizontal display area HAD1_2 to move the target projection object TPO1_1 to the position of the target projection object TPO1_2 in the second horizontal display area HAD1_2 (e.g., gradually adjust the angle value).

In some embodiments, the processor 13 can further dynamically adjust the tilt speed (e.g., adjust the displacement angle value at different speeds) based on the duration time (i.e., the user C continues to move his eye gaze position). Specifically, the processor 13 dynamically adjusts, based on a speed curve and a maximum displacement angle value, a displacement angle value of the target projection object to tilt the target projection object on the display screen 11 toward the second horizontal display area, and the speed curve is configured to indicate a duration time and the displacement angle value corresponding to the duration time.

For example, the speed curve can be expressed by the following formula:

$$\theta = \begin{cases} 100(t-t_0)^c, & t_{max} > t > t_0 \\ \theta_{max}, & t > t_{max} \end{cases}$$

In the above formula, the symbol θ is the displacement angle value, the symbol $\theta_{max}$ is the maximum displacement angle value, the symbol t is the current time value, the symbol to is the threshold time value (i.e., the displacement will not start until the threshold time value is exceeded), the symbol $t_{max}$ is the maximum time value, and the symbol c is a preset constant.

Figure 5:
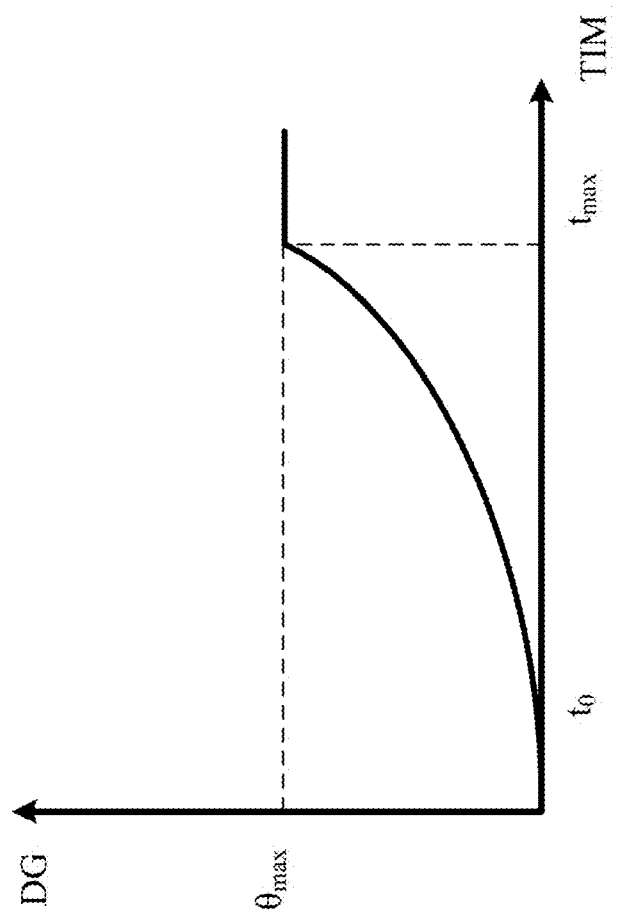
FIG. 5 is a schematic view depicting a speed curve of some embodiments.

For ease of understanding, please refer to the schematic diagram of a speed curve illustrated in FIG. 5. As shown in FIG. 5, the horizontal axis represents time TIM and the vertical axis represents angle value DG. In the present example, the symbol $\theta_{max}$ can be set to 50 degrees, the symbol to can be set to 0.2 seconds, the symbol $t_{max}$ can be set to 1 second, and the symbol c can be set to 2. In the present example, different time points correspond to different displacement angle values. When the time is between to and $t_{max}$, the angle of tilting is calculated based on the aforementioned formula. When the time exceeds $t_{max}$, the tilt angle value is the maximum displacement angle value of 50 degrees.

In some embodiments, the processor 13 can further set the activation threshold value of the staying time of the eye gaze position of the user C to reduce the chance of misjudgment. Specifically, in response to the eye gaze position of the user C on the display screen 11 moving from the first horizontal display area to the second horizontal display area, the processor 13 calculates a staying time of the eye gaze position of the user in the second horizontal display area. Next, the processor 13 determines whether the staying time is greater than a preset value. Finally, in response to the staying time being greater than the preset value, the processor 13 tilts the target projection object of the display screen 11 toward the second horizontal display area.

In some embodiments, the horizontal display areas on the display screen 11 are generated based on a plurality of application windows (e.g., menu window, virtual keyboard window). Specifically, the processor 13 slices the display screen 11 to generate the plurality of horizontal display areas based on a plurality of application windows on the display screen 11.

Figure 4:
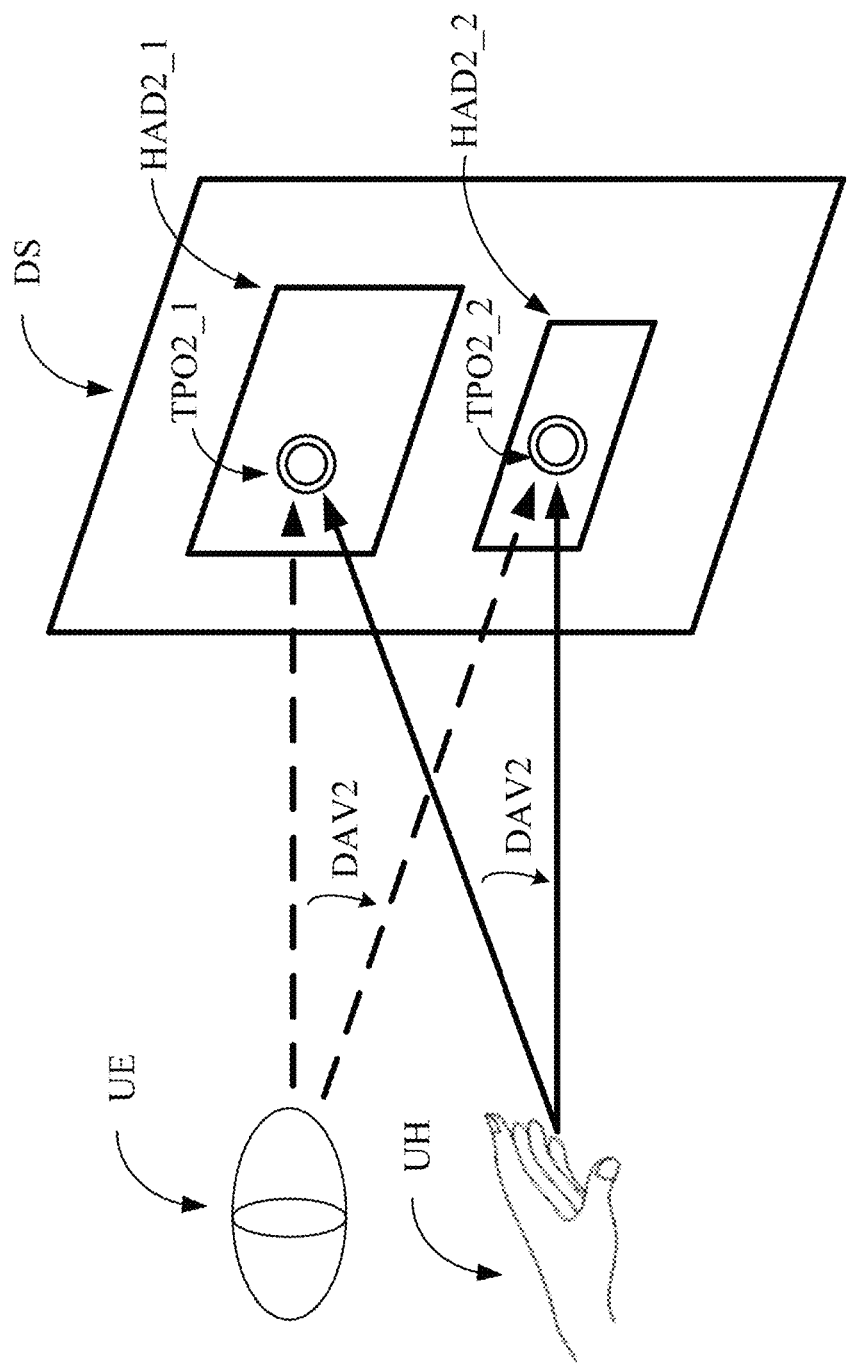
FIG. 4 is a schematic view depicting operations of some embodiments.

For ease of understanding, please refer to the operation diagram in FIG. 4. As shown in FIG. 4, the display screen DS has a first horizontal display area HAD2_1 and a second horizontal display area HAD2_2 corresponding to different application windows. After the processor 13 determines the position pointed by the user's hand UH of the user C, it generates a corresponding target projection object TPO2_1. In the present example, the target projection object TPO2_1 is located in the first horizontal display area HAD2_1.

Next, the processor 13 determines that the eye gaze position of the user's eye UE has moved from the first horizontal display area HAD2_1 to the second horizontal display area HAD2_2 and has been displaced by the angle value DAV2. In the present example, in response to the movement of the eye gaze position, the processor 13 tilts the target projection object TPO2_1 of the display screen 11 toward the second horizontal display area HAD2_2 to move the target projection object TPO2_1 to the position of the target projection object TPO2_2 in the second horizontal display area HAD2_2 (e.g., gradually adjust the angle value).

In some implementations, the processor 13 can directly jump the target projection object to a new location. Specifically, the target projection object is a cursor, and the processor 13 jumps the cursor to a center area of the second horizontal display area.

According to the above descriptions, the head-mounted display HMD provided by the present disclosure assists the head-mounted display in actively adjusting the position of the target projection object by analyzing the user's eye gaze position on the display screen at multiple time points. In addition, the head-mounted display HMD provided by the present disclosure can provide different angle adjustment mechanisms to perform gradually tilting operations or direct jumping operations accordingly. Furthermore, the head-mounted display HMD provided by the present disclosure provides the function of actively adjusting the position of the projection object, thereby improving the accuracy and efficiency of user interaction operations. Since the head-mounted display HMD provided by the present disclosure solves the problem of being blocked by obstacles in the existing technology, it improves the user's service experience.

Figure 6:
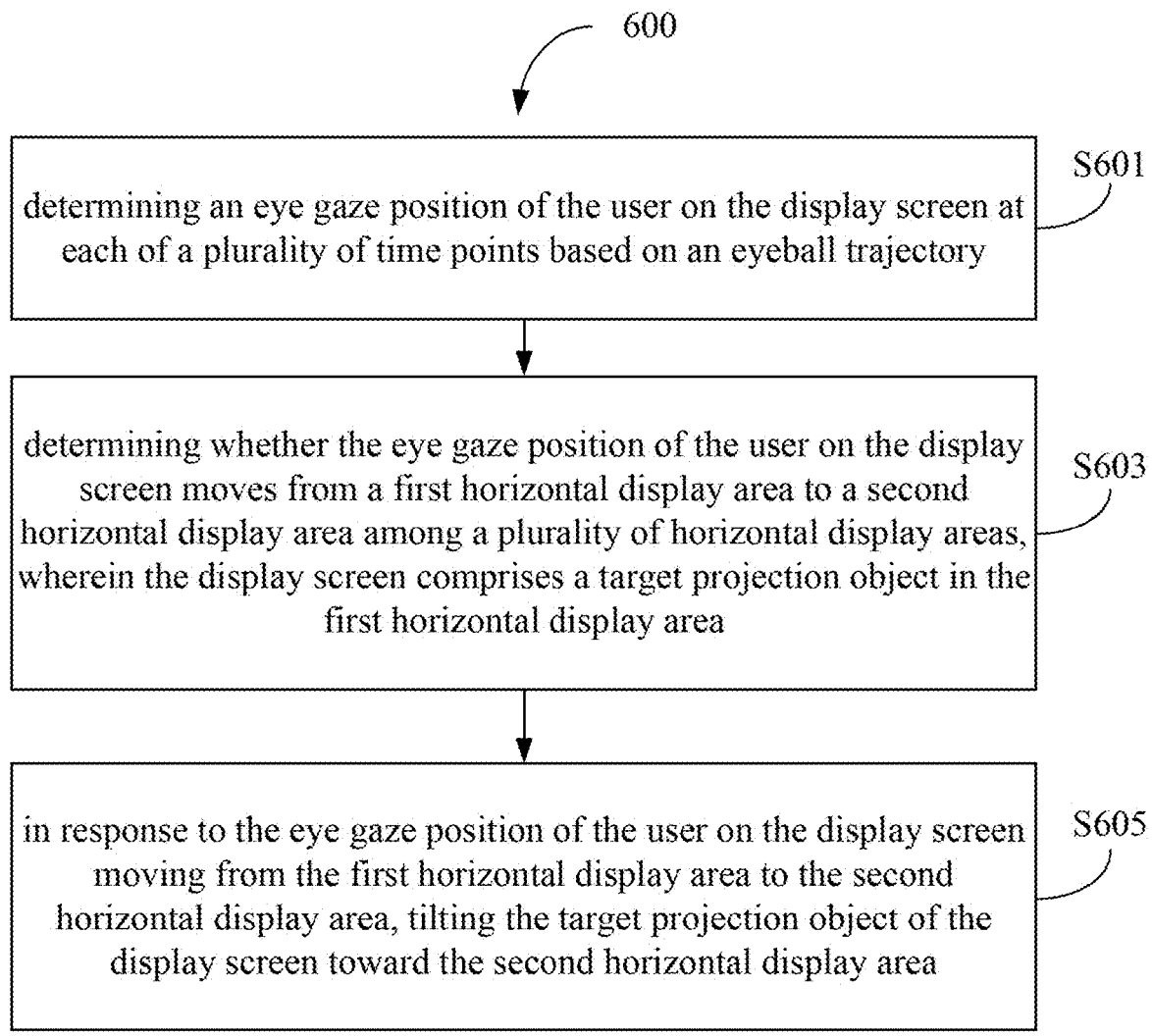
FIG. 6 is a partial flowchart depicting a projecting method of the second embodiment.

A second embodiment of the present disclosure is a projecting method and a flowchart thereof is depicted in FIG. 6. The projecting method 600 is adapted for an electronic apparatus (e.g., the head-mounted display HMD of the first embodiment). The electronic apparatus comprises a display screen and a processor, the display screen is configured to display a content to a user (e.g., the display screen 11 and the processor 13 of the first embodiment). The projecting method 600 tilts the target projection object on the display screen through the steps S601 to S605.

In the step S601, the electronic apparatus determines an eye gaze position of the user on the display screen at each of a plurality of time points based on an eyeball trajectory.

Next, in the step S603, the electronic apparatus determines whether the eye gaze position of the user on the display screen moves from a first horizontal display area to a second horizontal display area among a plurality of horizontal display areas, wherein the display screen comprises a target projection object in the first horizontal display area.

Finally, in the step S605, in response to the eye gaze position of the user on the display screen moving from the first horizontal display area to the second horizontal display area, the electronic apparatus tilts the target projection object of the display screen toward the second horizontal display area.

In some embodiments, wherein the electronic apparatus further comprises an image capturing device, the image capturing device is configured to generate a plurality of real-time images including a hand area corresponding to the user, and the projecting method 600 further comprises the following steps: performing a gesture tracking corresponding to the user based on the real-time images; and generating the target projection object of the display screen based on the gesture tracking.

In some embodiments, wherein the target projection object on the display screen is generated by a controller held by the user.

In some embodiments, wherein the eye gaze position of the user moves from the first horizontal display area to the second horizontal display area in a time interval, and the time interval is composed of a first time point and a second time point among the time points, and the step of tilting the target projection object of the display screen toward the second horizontal display area further comprises the following steps: calculating a displacement angle value of the eye gaze position at the first time point and the eye gaze position at the second time point; and tilting the target projection object of the display screen toward the second horizontal display area based on the displacement angle value.

In some embodiments, wherein the first time point and the second time point are a continuous time point.

In some embodiments, wherein the step of tilting the target projection object of the display screen toward the second horizontal display area further comprises the following steps: dynamically adjusting, based on a speed curve and a maximum displacement angle value, a displacement angle value of the target projection object to tilt the target projection object on the display screen toward the second horizontal display area.

In some embodiments, wherein the speed curve is configured to indicate a duration time and the displacement angle value corresponding to the duration time.

In some embodiments, wherein in response to the eye gaze position of the user on the display screen moving from the first horizontal display area to the second horizontal display area, the projecting method 600 further comprises the following steps: calculating a staying time of the eye gaze position of the user in the second horizontal display area; determining whether the staying time is greater than a preset value; and in response to the staying time being greater than the preset value, tilting the target projection object of the display screen toward the second horizontal display area.

In some embodiments, wherein the projecting method 600 further comprises the following steps: slicing the display screen to generate the plurality of horizontal display areas based on a plurality of application windows on the display screen.

In some embodiments, wherein the target projection object is a cursor, and the step of tilting the target projection object of the display screen toward the second horizontal display area further comprises the following steps: jumping the cursor to a center area of the second horizontal display area.

In addition to the aforesaid steps, the second embodiment can also execute all the operations and steps of the head-mounted display HMD set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., horizontal display areas, time points, etc.) are preceded by terms such as "first", or "second", and these terms of "first", or "second" are only used to distinguish these different words. For example, the "first" horizontal display area and the "second" horizontal display area are only used to indicate the horizontal display area used in different operations.

According to the above descriptions, the projecting technology (at least including the head-mounted display and the projecting method) provided by the present disclosure assists the head-mounted display in actively adjusting the position of the target projection object by analyzing the user's eye gaze position on the display screen at multiple time points. In addition, the projecting technology provided by the present disclosure can provide different angle adjustment mechanisms to perform gradually tilting operations or direct jumping operations accordingly. Furthermore, the projecting technology provided by the present disclosure provides the function of actively adjusting the position of the projection object, thereby improving the accuracy and efficiency of user interaction operations. Since the projecting technology provided by the present disclosure solves the problem of being blocked by obstacles in the existing technology, it improves the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A head-mounted display, comprising:
  a display screen, being configured to display a content to a user; and
  a processor, being electrically connected to the display screen, and being configured to perform operations comprising:
    determining an eye gaze position of the user on the display screen at each of a plurality of time points based on an eyeball trajectory;
    determining whether the eye gaze position of the user on the display screen moves from a first horizontal display area to a second horizontal display area among a plurality of horizontal display areas, wherein the display screen comprises a target projection object in the first horizontal display area; and
    in response to the eye gaze position of the user on the display screen moving from the first horizontal display area to the second horizontal display area, tilting the target projection object of the display screen toward the second horizontal display area;
    wherein the operation of tilting the target projection object of the display screen toward the second horizontal display area further comprises the following operations:
      dynamically adjusting, based on a speed curve and a maximum displacement angle value, a displacement angle value of the target projection object to tilt the target projection object on the display screen toward the second horizontal display area.

2. The head-mounted display of claim 1, wherein the head-mounted display further comprises:
an image capturing device, being electrically connected to the processor, and being configured to generate a plurality of real-time images including a hand area corresponding to the user;
wherein the processor further performs the following operations:
performing a gesture tracking corresponding to the user based on the real-time images; and
generating the target projection object of the display screen based on the gesture tracking.

3. The head-mounted display of claim 1, wherein the target projection object on the display screen is generated by a controller held by the user.

4. The head-mounted display of claim 1, wherein the eye gaze position of the user moves from the first horizontal display area to the second horizontal display area in a time interval, and the time interval is composed of a first time point and a second time point among the time points, and the operation of tilting the target projection object of the display screen toward the second horizontal display area further comprises the following operations:
calculating the displacement angle value between a first virtual extension line of the user corresponding to the eye gaze position at the first time point and a second virtual extension line of the user corresponding to the eye gaze position at the second time point; and
tilting the target projection object of the display screen toward the second horizontal display area based on the displacement angle value.

5. The head-mounted display of claim 4, wherein the first time point and the second time point are two adjacent preset time point.

6. The head-mounted display of claim 1, wherein the speed curve is configured to indicate a duration time and the displacement angle value corresponding to the duration time.

7. The head-mounted display of claim 1, wherein in response to the eye gaze position of the user on the display screen moving from the first horizontal display area to the second horizontal display area, the processor further performs the following operations:
calculating a staying time of the eye gaze position of the user in the second horizontal display area;
determining whether the staying time is greater than a preset value; and
in response to the staying time being greater than the preset value, tilting the target projection object of the display screen toward the second horizontal display area.

8. The head-mounted display of claim 1, wherein the processor further performs the following operations:
slicing the display screen to generate the plurality of horizontal display areas based on a plurality of application windows on the display screen.

9. The head-mounted display of claim 1, wherein the target projection object is a cursor, and the operation of tilting the target projection object of the display screen toward the second horizontal display area further comprises the following operations:
jumping the cursor to a center area of the second horizontal display area.

10. A projecting method, being adapted for use in an electronic apparatus, wherein the electronic apparatus comprises a display screen and a processor, the display screen is configured to display a content to a user, and the projecting method comprises the following steps:
determining an eye gaze position of the user on the display screen at each of a plurality of time points based on an eyeball trajectory;
determining whether the eye gaze position of the user on the display screen moves from a first horizontal display area to a second horizontal display area among a plurality of horizontal display areas, wherein the display screen comprises a target projection object in the first horizontal display area; and
in response to the eye gaze position of the user on the display screen moving from the first horizontal display area to the second horizontal display area, tilting the target projection object of the display screen toward the second horizontal display area;
wherein the step of tilting the target projection object of the display screen toward the second horizontal display area further comprises the following steps:
dynamically adjusting, based on a speed curve and a maximum displacement angle value, a displacement angle value of the target projection object to tilt the target projection object on the display screen toward the second horizontal display area.

11. The projecting method of claim 10, wherein the electronic apparatus further comprises an image capturing device, the image capturing device is configured to generate a plurality of real-time images including a hand area corresponding to the user, and the projecting method further comprises the following steps:
performing a gesture tracking corresponding to the user based on the real-time images; and
generating the target projection object of the display screen based on the gesture tracking.

12. The projecting method of claim 10, wherein the target projection object on the display screen is generated by a controller held by the user.

13. The projecting method of claim 10, wherein the eye gaze position of the user moves from the first horizontal display area to the second horizontal display area in a time interval, and the time interval is composed of a first time point and a second time point among the time points, and the step of tilting the target projection object of the display screen toward the second horizontal display area further comprises the following steps:
calculating the displacement angle value between a first virtual extension line of the user corresponding to the eye gaze position at the first time point and a second virtual extension line of the user corresponding to the eye gaze position at the second time point; and
tilting the target projection object of the display screen toward the second horizontal display area based on the displacement angle value.

14. The projecting method of claim 13, wherein the first time point and the second time point are two adjacent preset time point.

15. The projecting method of claim 10, wherein the speed curve is configured to indicate a duration time and the displacement angle value corresponding to the duration time.

16. The projecting method of claim 10, wherein in response to the eye gaze position of the user on the display screen moving from the first horizontal display area to the second horizontal display area, the projecting method further comprises the following steps:
calculating a staying time of the eye gaze position of the user in the second horizontal display area;

determining whether the staying time is greater than a preset value; and in response to the staying time being greater than the preset value, tilting the target projection object of the display screen toward the second horizontal display area.

17. The projecting method of claim 10, wherein the projecting method further comprises the following steps:

slicing the display screen to generate the plurality of horizontal display areas based on a plurality of application windows on the display screen.

18. The projecting method of claim 10, wherein the target projection object is a cursor, and the step of tilting the target projection object of the display screen toward the second horizontal display area further comprises the following steps:

jumping the cursor to a center area of the second horizontal display area.

* * * * *